US008882264B2

(12) United States Patent
Bradley et al.

(10) Patent No.: US 8,882,264 B2
(45) Date of Patent: Nov. 11, 2014

(54) SIMULTANEOUS VISION LENSES, DESIGN STRATEGIES, APPARATUSES, METHODS, AND SYSTEMS

(75) Inventors: Arthur Bradley, Bloomington, IN (US); Peter Kollbaum, Bloomington, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 25 days.

(21) Appl. No.: 13/496,613

(22) PCT Filed: Sep. 16, 2010

(86) PCT No.: PCT/US2010/049133
§ 371 (c)(1), (2), (4) Date: Mar. 16, 2012

(87) PCT Pub. No.: WO2011/035033
PCT Pub. Date: Mar. 24, 2011

(65) Prior Publication Data
US 2012/0176581 A1   Jul. 12, 2012

Related U.S. Application Data

(60) Provisional application No. 61/242,966, filed on Sep. 16, 2009.

(51) Int. Cl.
*G02C 7/00* (2006.01)
*G02C 7/02* (2006.01)
*G02C 7/04* (2006.01)
*A61B 3/10* (2006.01)

(52) U.S. Cl.
CPC .............. *G02C 7/02* (2013.01); *G02C 2202/22* (2013.01)
USPC ..................................... 351/159.05; 351/205

(58) Field of Classification Search
USPC .......................................... 351/159, 246, 205
See application file for complete search history.

(56) References Cited

U.S. PATENT DOCUMENTS 5,790,231 A    8/1998   Mercier
6,145,987 A   11/2000   Baude et al.
(Continued)

FOREIGN PATENT DOCUMENTS

EP             1 902 672 B1    4/2010

OTHER PUBLICATIONS

International Search Report and Written Opinion, PCT/US2010/049133, Indiana University Research & Technology Corporation, Oct. 29, 2010, International Searching Authority/US.

(Continued)

*Primary Examiner* — Scott J Sugarman
*Assistant Examiner* — Mustak Choudhury
(74) *Attorney, Agent, or Firm* — Krieg DeVault LLP

(57) ABSTRACT

Certain exemplary embodiments include methods of determining ophthalmic prescriptions to ameliorate presbyopia. Certain exemplary embodiments provide an ophthalmic lens having spherical aberration of the same sign as the patient's eye and of a magnitude effective to substantially provide a desired net spherical aberration for an optical system including the patient's eye and the ophthalmic lens where the desired net spherical aberration provides a desired increase in near vision. Certain exemplary embodiments include contact lenses, intraocular lenses, corneal onlays, corneal inlays, or corneal surgeries providing spherical aberration of the same sign as the patient's eye and of a magnitude effective to substantially provide a desired net spherical aberration for an optical system including the patient's eye and the ophthalmic lens where the desired net spherical aberration provides a desired increase in near distance vision.

17 Claims, 8 Drawing Sheets

(56) References Cited

U.S. PATENT DOCUMENTS

| | | |
|---|---|---|
| 6,224,211 B1 * | 5/2001 | Gordon ................... 351/159.78 |
| 6,390,624 B1 | 5/2002 | Hough |
| 6,802,605 B2 | 10/2004 | Cox et al. |
| 7,052,133 B2 | 5/2006 | Lindacher et al. |
| 7,061,693 B2 | 6/2006 | Zalevsky |
| 7,118,214 B2 | 10/2006 | Cox |
| 2005/0246016 A1 * | 11/2005 | Miller et al. ................. 623/5.11 |
| 2006/0244916 A1 | 11/2006 | Guillon |
| 2008/0165324 A1 | 7/2008 | Lindacher et al. |
| 2009/0051876 A1 | 2/2009 | Seiler et al. |
| 2009/0079940 A1 * | 3/2009 | Dai et al. ...................... 351/246 |
| 2009/0216218 A1 * | 8/2009 | Somani et al. ................... 606/5 |
| 2010/0057202 A1 | 3/2010 | Bogaert |

OTHER PUBLICATIONS

International Preliminary Report on Patentability, PCT/US2010/049133, Indiana University Research & Technology Corporation, Mar. 29, 2012, The International Bureau of WIPO.

James E. Sheedy, Prescribing Multifocal Lenses, Clinical Ophthalmology, vol. 1, ch. 44, 2005.

* cited by examiner

SIMULTANEOUS VISION LENSES, DESIGN STRATEGIES, APPARATUSES, METHODS, AND SYSTEMS

PRIORITY

This application is a §371 national stage patent application of PCT/US2010/049133, filed Sep. 16, 2010, and claims the benefit of priority to U.S. Provisional Application No. 61/242,966, filed Sep. 16, 2009, each of which is incorporated herein by reference.

BACKGROUND

Presbyopia is an inevitable age-related impairment of near vision resulting from a decrease in the eye's accommodative ability. A number of approaches for treating presbyopia have been proposed, but they suffer from significant shortcomings and drawbacks. Human eyes that require vision correction often contain inherent levels of spherical aberration, typically positive. That is, the power of the human eye increases from the center of the pupil to the pupil margins. This spherical aberration can be defined as a power difference between the pupil center and pupil margins, or by some standard (e.g. Zernike or Seidel), or some non-standard radially varying power (symmetric or non-symmetric), wavefront slope or wavefront phase error. Other eyes that require correction contain inherent levels of negative spherical aberration. That is, the power of the human eye decreases from the center of the pupil to the pupil margins. This same situation may exist in eyes following cataract surgery (e.g. pseudophakic eyes). Conventional corrections may also include a modulation of power as a function of distance from the lens center. In some the lowest lens power is in the lens center, and highest in the periphery, and in others, the converse is true. This change in lens power from the lens center to the periphery can be discrete (e.g. bifocal, trifocal) or continuous (e.g. multifocal). In each case, the resultant power distribution or spherical aberration causing a simultaneous vision add effect attained by the wearer is determined by the resultant sum of the distribution of power across the pupil of both the eye plus the lens. Some approaches propose simultaneous vision or multifocal contact lenses that introduce spherical aberration to an eye-lens system to provide simultaneous near and distance correction. Such approaches suffer from a number of disadvantages. For example, decentration of lenses following this approach introduces coma, prism and other aberration. Some approaches propose correcting all the spherical aberration within a patient's eye, while others propose only partially correcting any spherical aberration existing in a patient's eye in order to leave residual spherical aberration after correction. The full-correction spherical aberration approaches are limited because they correct the spherical aberration required to provide multifocality, or after correcting spherical aberration require the introduction of larger amounts of spherical aberration. The partial spherical aberration correction approaches are limited and can only provide spherical aberration less than that existing in the uncorrected eye. At best such approaches provide a limited advantage over complete correction of existing spherical aberration. There remains significant disagreement as to corrective approaches with respect to spherical aberration. Some approaches argue complete correction is best, some argue partial correction is best, some argue for no correction of spherical aberration. Other approaches directed to presbyopia correction focus on adding spherical aberration without considering existing spherical aberration. Furthermore, confusion among these approaches has arisen because some presbyopic corrective lens designs have discrete add power zones within which they try to correct spherical aberration (completely or partially). Presbyopia continues to present significant unmet challenges and difficulties for vision correction both alone and in combination with correction of other conditions.

SUMMARY

For the purposes of clearly, concisely and exactly describing exemplary embodiments of the invention, the manner and process of making and using the same, and to enable the practice, making and use of the same, exemplary embodiments will now be summarized and described in detail, and reference will be made to the exemplary embodiments illustrated in the figures and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

Certain exemplary embodiments include methods of determining ophthalmic prescriptions to ameliorate presbyopia. Certain exemplary embodiments provide an ophthalmic lens having spherical aberration of the same sign as the patient's eye and of a magnitude effective to substantially provide a desired net spherical aberration for an optical system including the patient's eye and the ophthalmic lens where the desired net spherical aberration provides a desired multifocality, that is, a desired increase in depth of field (increased near vision while retaining functional distance vision). Certain exemplary embodiments include ophthalmic corrections including contact lenses, intraocular lenses, corneal onlays, corneal inlays, or corneal surgeries providing spherical aberration of the same sign as the patient's eye and of a magnitude effective to substantially provide a desired net spherical aberration for an optical system including the patient's eye and the ophthalmic correction where the desired net spherical aberration provides a desired increase in depth of field, while maximizing image quality by minimizing the aberration required in the lens and accordingly the aberration the lens induces when on the eye (e.g. due to decentration).

DETAILED DESCRIPTION

Figure 1:
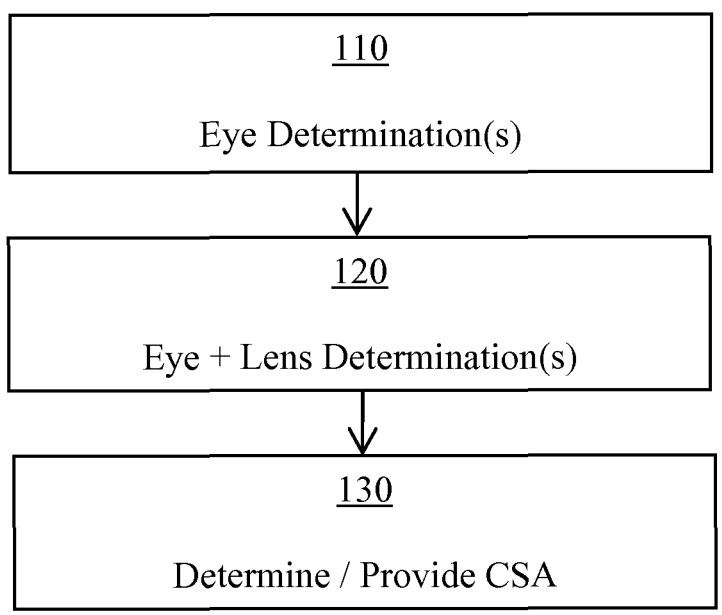
FIG. 1 is a flow diagram according to an exemplary method of determining a corrective ophthalmic prescription.

FIG. 1 illustrates a flow diagram of an exemplary process 100 for determining a corrective ophthalmic prescription. Process 100 begins at operation 110 in which one or more determinations of characteristics of a patient's eye are performed. Exemplary determinations include determination of the spherical aberration of the patient's eye, determination of the degree of adaptive accommodation of the patient's eye, determination of astigmatism of the patient's eye, determination of myopia of the patient's eye, determination of hyperopia of the patient's eye, and determination of the desired spherical aberration of an optical system including the patient's eye effective to provide a desired multifocality. By adding mutifocality (range of optical power) an increased depth of field (the range of motion along the optical axis of an object or specimen can move while still meeting a desired criterion level of vision) can be obtained and a corresponding increase in depth of focus of the eye can be achieved. Thus a desired multifocality can be selected which is effective to provide a desired increase in near vision, while retaining distance vision. These and other characteristics of a patient's eye may be determined based upon one or more measurements and processing performed upon the data provided by those measurements. Exemplary measurement and determinations of the characteristics of the patient's eye may be performed using a variety of instruments, systems and techniques including, for example, those described below in connection with FIG. 2. From operation 110, method 100 proceeds to operation 120.

In operation 120 one or more determinations of characteristics of an optical system including a patient's eye in combination with an ophthalmic correction are performed. This operation can be performed by direct measurement of the patient's eye and the ophthalmic correction, by modeling or calculation using either optical theory or previously collected data (e.g. population data), or by combinations of measurement and modeling or calculation. In certain embodiments one or more measurements of characteristics of a patient's eye in combination with a trial contact lens are performed. In certain embodiments one or more determinations of a patient's eye in combination with an ophthalmic correction involving surgical intervention such as an intraocular lens, corneal inlay or onlay, or refractive surgery are made using computer-based modeling techniques. Exemplary determinations include determination of the spherical aberration of the eye-lens combination, determination of the error of actual spherical aberration of the lens relative to its intended or nominal spherical aberration, and determination of the spherical aberration attributable to the flexure of the lens on the eye. These and other exemplary measurements and determinations may be performed by modeling or calculations, measured using a variety of instruments, systems and techniques including, for example, those described below in connection with FIG. 2, or through combinations of measurement and modeling techniques. From operation 120, method 100 proceeds to operation 130.

In operation 130 an ophthalmic correction including specific spherical aberration is determined and provided. The ophthalmic correction may be of a number of forms including, for example, a contact lens, in intraocular lens, a corneal inlay, a corneal onlay, or a surgical correction such as laser-assisted in situ keratomileusis (LASIK), other surgical corneal modifications or other types of surgical modifications. Certain surgical embodiments decrease the amount of ablation that occurs, preserving more of the corneal tissue and, therefore, corneal integrity, as well as faster surgeries with less chance of errors. In certain embodiments the ophthalmic correction is characterized in that it introduces spherical aberration of the same sign as the spherical aberration inherent in the eye and of a magnitude effective to substantially provide a desired increase in near distance vision in combination with the spherical aberration of the eye.

Figure 2:
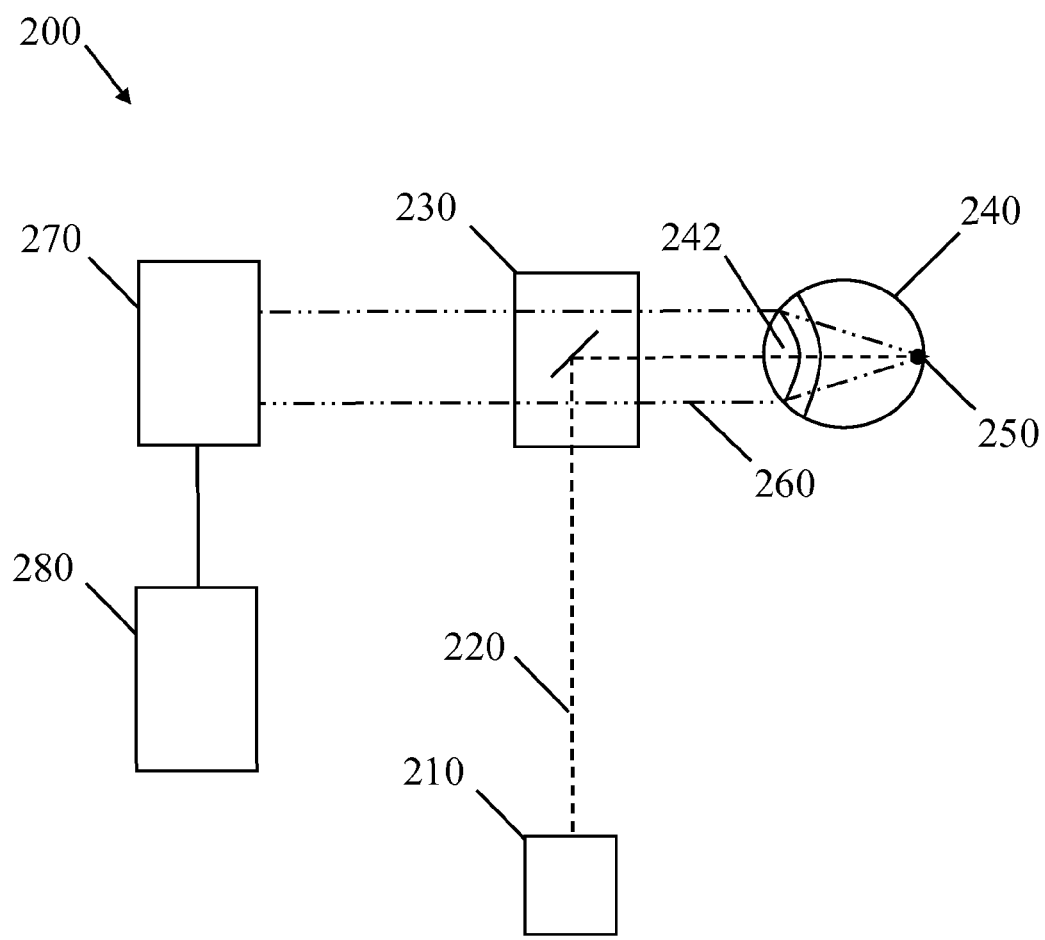
FIG. 2 is a simplified schematic diagram of an exemplary ophthalmic wavefront sensor.

FIG. 2 illustrates a simplified schematic diagram of an exemplary ophthalmic wavefront sensor system 200 which can be used to perform measurements of a patient's eye and measurements of optical systems including a patient's eye and a lens, for example, those described above in connection with FIG. 1. It will be appreciated that system 200 is only one non-limiting example of the multiple systems and instruments which can be used to measure spherical aberration. System 200 includes laser 210 which is operable to emit laser beam 220. Laser beam 220 is directed to optical system 230 which directs laser beam 220 through pupil 242 to spot 250 on the retina of eye 240. Wavefront 260 is reflected from spot 250, exits through pupil 242 of eye 240, and travels through optical system 230 to sensor system 270. Sensor system 270 includes a sensor which is operable to measure information of wavefront 260. Sensor system 270 provides measured information of wavefront 260, such as wavefront slope information, to processing system 280 which includes computer executable instruction operable to perform processing operations on the measured information including the operations described herein. It shall be understood that system 200 is one simplified example of an ophthalmic wavefront sensor system and that a number of embodiments include additional or alternate ophthalmic sensor systems including, for example, Hartmann Shack wavefront sensors, Hartmann-Moiré wavefront sensor, diffraction wavefront sensors, curvature sensors, various interferometers, scanning laser ophthalmoscopes, scanning fundus cameras, nerve fiber analyzers, optical coherence tomography systems, retina imaging instruments such as laser ray tracing instruments and point spread function cameras or other ophthalmic sensor systems that employ adaptive optics, for example, to improve performance by measuring and then correcting the eye's aberrations.

Sensor system 270 is operable to provide measured information of wavefront 260 to processing system 280. In certain exemplary embodiments processing system 280 includes one or more microprocessors, ASICs and/or other processing means operable to execute instructions, and computer readable medium or media configured to store computer executable instructions, for example one or more memory modules configured with software, firmware or combinations thereof. In some embodiments processing system is operable to determine ophthalmic prescriptions directly from the slope measurements without requiring wavefront reconstruction. In certain exemplary embodiments processing system 280 is operable to determine wavefront maps and wavefront error or aberration maps.

Figure 3:
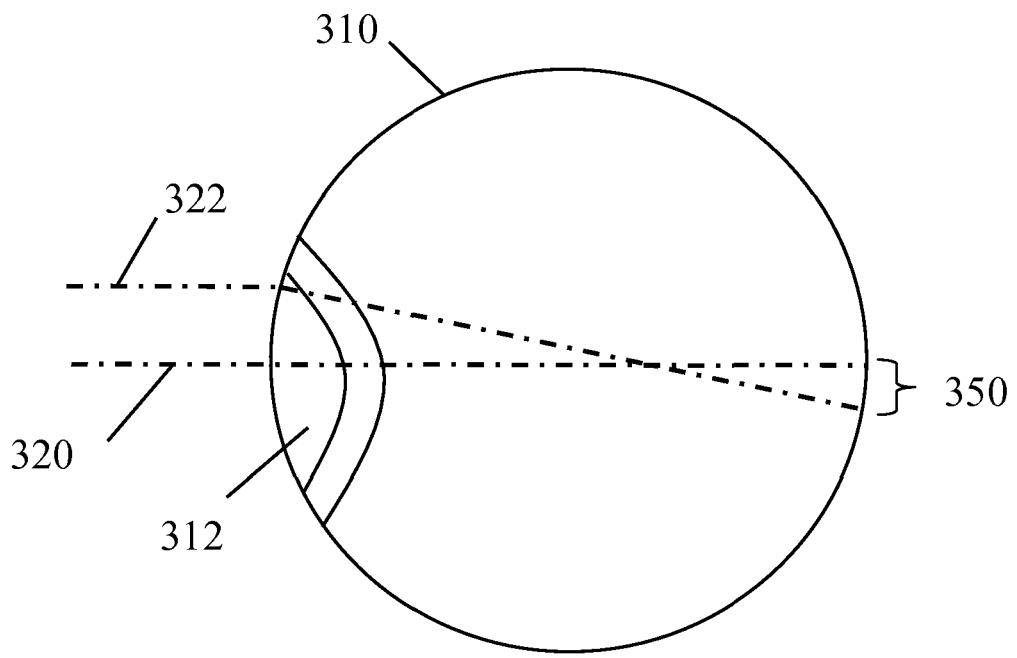
FIG. 3 is a simplified schematic diagram illustrating inherent spherical aberration in a patient's eye.

FIG. 3 illustrates an eye 310 having an inherent level of spherical aberration. Light rays 320 and 322 may enter eye 310 through pupil 312. Due to the inherent spherical aberration of the eye 310, light rays 320 and 322 contact the retina of eye 310 at points separated by a distance 350.

Figure 4:
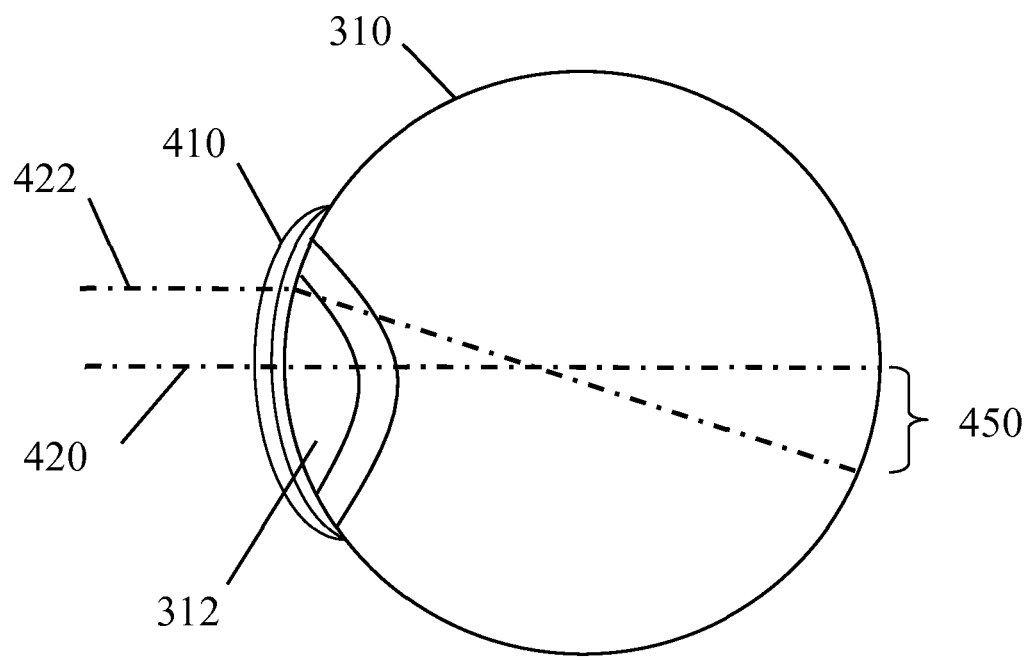
FIG. 4 is a simplified schematic diagram illustrating inherent spherical aberration in a patient's eye in combination with a corrective lens providing spherical aberration.

FIG. 4 illustrates eye 310 in combination with a contact lens 410. Contact lens provides additional spherical aberration of the same sign as the eye. The overall spherical aberration of the lens eye system results in light rays 420 and 422 contacting the retina of eye 310 at points separated by a distance 450 which is greater than the distance 350 of the eye alone.

Figure 5:
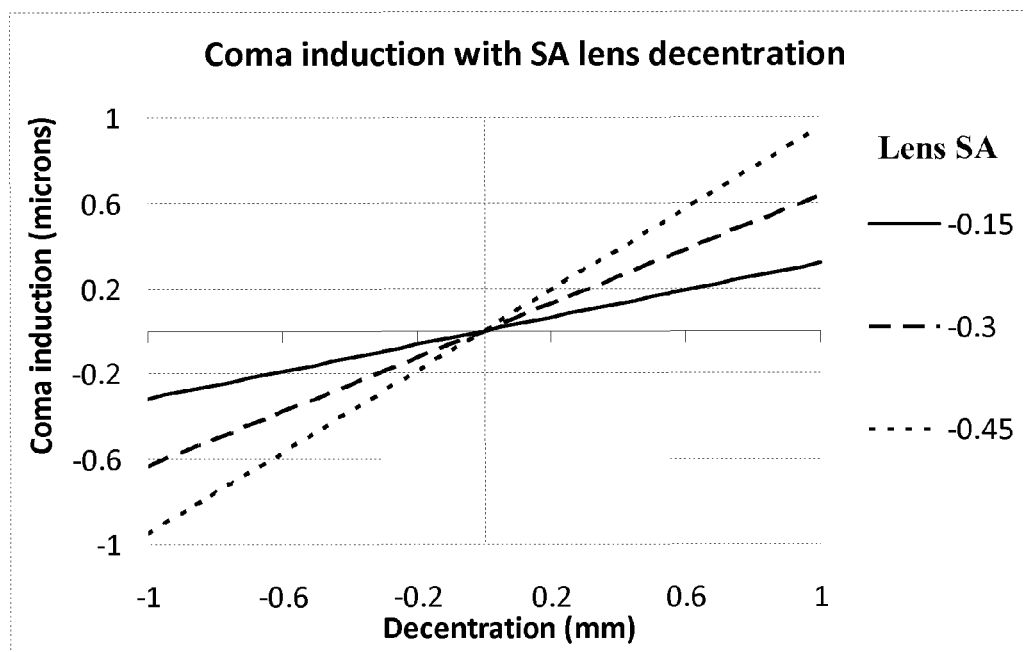
FIG. 5 is a graph illustrating the relationship between coma, lens decentration, and lens spherical aberration.

FIG. 5 illustrates a graph showing the relationship between induced coma, and lens decentration for corrective lenses having differing levels of spherical aberration. As illustrated in FIG. 5 there is a linear relationship between the amount of coma and the decentration of the lens which depends upon the spherical aberration of the lens. Thus, for example, a lens with a spherical aberration of 0.15 microns that decenters 0.5 mm will produce about 0.2 microns of coma. A similarly decentered lens with a spherical aberration of 0.3 microns will produce about 0.4 microns of coma. A similarly decentered lens with a spherical aberration of 0.45 microns will produce about 0.6 microns of coma. The presence of coma is one example of additional aberration that may result from decentration of the lens or other ophthalmic prescription including spherical aberration on the eye. As corrections can often decenter in/on the eye, and can move during blinking and eye movements, these decentrations will induce unwanted aberration, such as coma in direct proportion to the levels of spherical aberration in the eye and amount of decentration. To minimize the introduction of unwanted levels of coma, the exemplary embodiment includes the lowest levels of spherical aberration in order to induce the lowest levels of unwanted coma, while still providing the appropriate multifocality.

Figure 6:
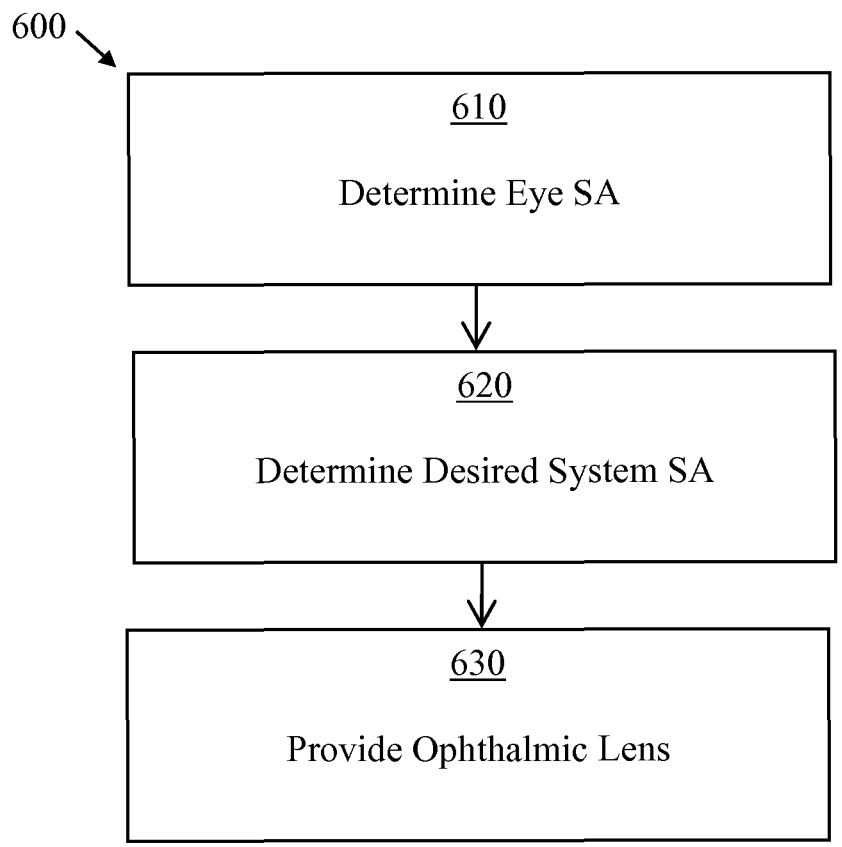
FIG. 6 is a flow diagram according to an exemplary method of providing an ophthalmic lens.

FIG. 6 illustrates a flow diagram 600 describing an exemplary method of determining an ophthalmic correction. Operation 610 determines a sign-specific level of spherical aberration of a patient's eye. In certain embodiments a sign-specific level of spherical aberration of a patient's eye is determined by performing one or more measurements. In certain embodiments a sign-specific level of spherical aberration of a patient's eye is determined based upon calculation using either optical theory or previously collected data (e.g. population data). In certain embodiments a sign-specific level of spherical aberration of a patient's eye is determined based upon combinations of measurements and calculations. From operation 610 flow diagram 600 proceeds to operation 620.

Operation 620 determines a desired level of spherical aberration for an optical system including the patient's eye effective to provide desired multifocality. From operation 630 flow diagram 600 proceeds to operation 630. Operation 630 provides an ophthalmic lens having spherical aberration of the same sign as the patient's eye and of a magnitude effective to provide substantially the desired spherical aberration for the optical system.

In certain embodiments the spherical aberration of the lens is determined according to the equation: LSA=ILSA−Σ(ESA, LPSA, LESA, LFSA) where LSA is the lens spherical aberration, ILSA is the manufacture intended lens spherical aberration or desired asphericity or multifocality, ESA is eye spherical aberration, LPSA is lens spherical aberration determined by lens power, LESA is the lens-error spherical aberration or the difference between the actual off-eye lens spherical aberration and the ILSA, and LFSA is a spherical aberration introduced by lens flexure on the eye.

In certain embodiments the spherical aberration of the lens is determined according to the equation: LSA=DSA−Σ(ESA, LESA, LFSA), where LSA is the spherical aberration provided by the ophthalmic lens, DSA is desired level of spherical aberration for an optical system including the patient's eye effective to provide desired multifocality, ESA is the spherical aberration of the eye, LESA is the error in spherical aberration of the lens relative to its intended design, and LFSA is the spherical aberration due to flexure of the lens on the eye.

In certain embodiments the spherical aberration of the lens is determined according to the equation: LSA=ISA−Σ(ESA, LPSA, LESA, LFSA) where LSA is the spherical aberration of the ophthalmic lens, ISA is the intended level of spherical aberration, ESA is the sign-specific level of spherical aberration of the patient's eye, LPSA is spherical aberration of the ophthalmic lens determined by its lens power, LESA is lens-error spherical aberration due to the difference between the intended off-eye lens spherical aberration of the lens and actual off-eye lens spherical aberration of the lens, and LFSA is spherical aberration introduced by lens flexure on the eye.

Figure 7:
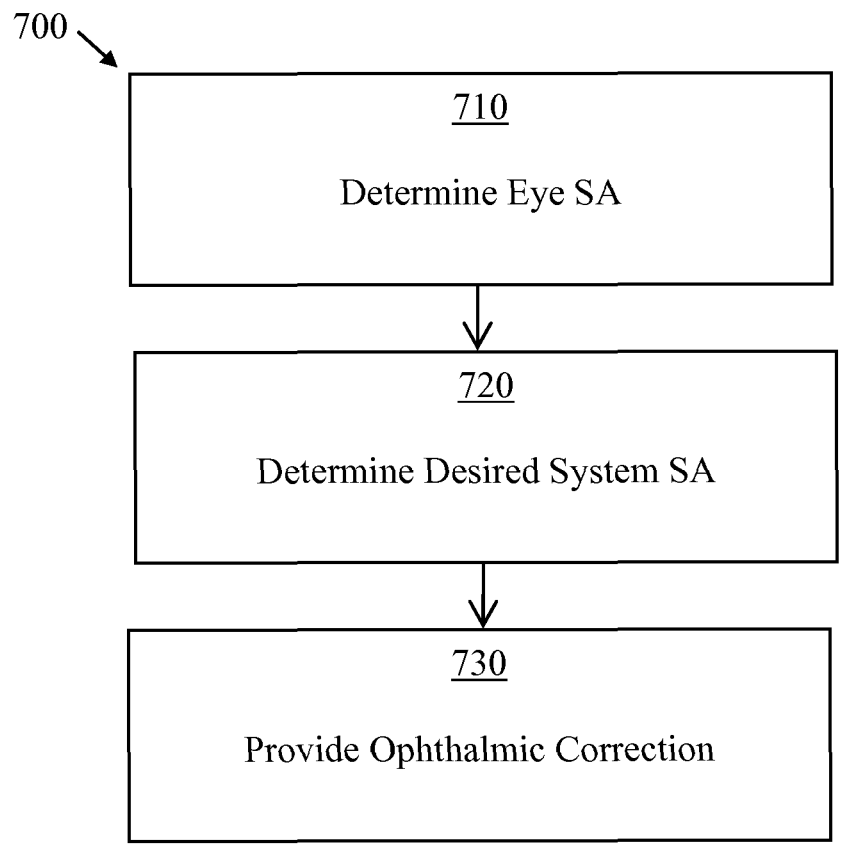
FIG. 7 is a flow diagram according to an exemplary method of providing an ophthalmic correction.

FIG. 7 illustrates a flow diagram 700 describing an exemplary method of determining an ophthalmic correction. Operation 710 determines a sign-specific level of spherical aberration of a patient's eye. In certain embodiments a sign-specific level of spherical aberration of a patient's eye is determined based upon calculation using either optical theory or previously collected data (e.g. population data). In certain embodiments a sign-specific level of spherical aberration of a patient's eye is determined based upon combinations of measurements and calculations. From operation 710 process 700 proceeds to operation 720.

Operation 720 determines a desired level of spherical aberration for an optical system including the patient's eye effective to provide desired multifocality effective to provide a desired increased range of optical power required to and a desired increased range of vision. From operation 720 process 700 proceeds to operation 730. Operation 730 provides an ophthalmic correction having spherical aberration of the same sign as the patient's eye and of a magnitude effective to provide substantially the desired spherical aberration for the optical system. In certain embodiments the ophthalmic correction is a contact lens. In certain embodiments the ophthalmic correction is a corneal inlay or a corneal onlay. In certain embodiments the ophthalmic correction is a surgical modification of the cornea. In certain embodiments the ophthalmic correction is an intraocular lens.

In certain embodiments spherical aberration provided by the correction is determined in accordance with the equation: CSA=DSA−Σ(ESA, CESA), where CSA is the spherical aberration provided by the ophthalmic correction, DSA is desired level of spherical aberration for an optical system including the patient's eye effective to provide desired multifocality, ESA is the spherical aberration of the eye, and CESA is the error in spherical aberration of the ophthalmic correction relative to its intended design.

Some exemplary embodiments include lenses, design strategies, apparatuses, systems and methods for simultaneous vision contact lenses, IOLs, ophthalmic surgical prescriptions such as LASIK prescriptions, and other lenses or corrective prescriptions that employ distance and near correction in combination. Simultaneous vision lenses may be designed according to a number of design strategies. Some simultaneous vision corrections include optical correction which varies radially from the lens center. Such lenses may include distance correction in a central portion and near correction in a peripheral region, or may include distance correction in a peripheral portion and near correction in a central region.

Certain exemplary embodiments eliminate or minimize unnecessary and unintended aberration in simultaneous vision lenses by minimizing the spherical aberration within the lens design. Exemplary design strategies account for the eye's spherical aberration, the lens's spherical aberration, and the spherical aberration introduced by the lens's flexure on the eye. In order to achieve a desired correction with a minimum level of spherical aberration, while on the eye lens asphericity is determined in accordance with the equation:

$$OELSA = ILSA + \Sigma(ESA, LPSA, LESA, LFSA)$$

In the foregoing equation OELSA is on-eye lens spherical aberration, ILSA is the manufacture intended lens spherical aberration or desired asphericity or multifocality, ESA is eye spherical aberration, LPSA is lens spherical aberration determined by lens power, LESA is the lens-error spherical aberration or the difference between the actual off-eye lens spherical aberration and the ILSA, and LFSA is a spherical aberration introduced by lens flexure on the eye. This equation shows that the actual achieved asphericity (OELSA) will not generally be the same as that incorporated by design into the aspheric lens (ILSA). Incorporating knowledge of ESA, LPSA, LESA, and LFSA into a design, however, allows determination of the minimum amount of spherical aberration required to have the desired simultaneous vision effect. The asphericity or spherical aberration (LSA) built into the multifocal lens needed to achieve the desired eye+lens multifocality (DLA) will, therefore, be the desired lens multifocality (ILSA) minus the inherent combined eye+lens asphericities (ESA, LPSA, LESA, and LEFSA) as described in the following equation:

$$LSA = ILSA - \Sigma(ESA, LPSA, LESA, LFSA)$$

Note that any or all elements of the foregoing equations may be negative or positive. Note also that our use of the term spherical aberrations incorporates various representations of asphericity, including, but not limited to those that follow: a power difference between the pupil center and pupil margins, standard (e.g. Zernike or Seidel), or some non-standard radially varying power (symmetric or non-symmetric), wavefront slope or wavefront phase error.

In order to achieve the desired level of spherical aberration in the eye and lens combined, the lens itself must have sufficient spherical aberration in combination with the eye to produce the desired multifocality. If the eye has positive spherical aberration, and the lens design achieves its multifocality by introducing negative spherical aberration, it will have to include the refractive level of spherical aberration plus an additional amount of negative spherical aberration required to cancel the ocular positive spherical aberration. Thus the lens required will have extra negative spherical aberration, and therefore, as it decenters it will introduce extra coma. This effect can be canceled or minimized by employing a lens design that complements rather than opposes the inherent spherical aberration of the eye. For eyes with positive spherical aberration, employ a lens design that has positive spherical aberration, and the converse for eyes with negative spherical aberration. Thus, to achieve the refractive spherical aberration required to provide appropriate multifocality, the lens need only introduce a level of spherical aberration equal to the desired spherical aberration minus the ocular spherical aberration. Such lenses will include a smaller amount of spherical aberration and therefore will minimize or reduce unwanted coma and provide improved vision quality should they decenter.

Figure 8:
FIG. 8 illustrates simulated retinal image of a typical letter chart of a sphere and astigmatism corrected eye with +0.2 microns of spherical aberration wearing a lens with +0.2 microns of spherical aberration that is decentered 0.5 mm temporally and vertically, inducing 0.21 microns of vertical and horizontal coma.
Figure 9:
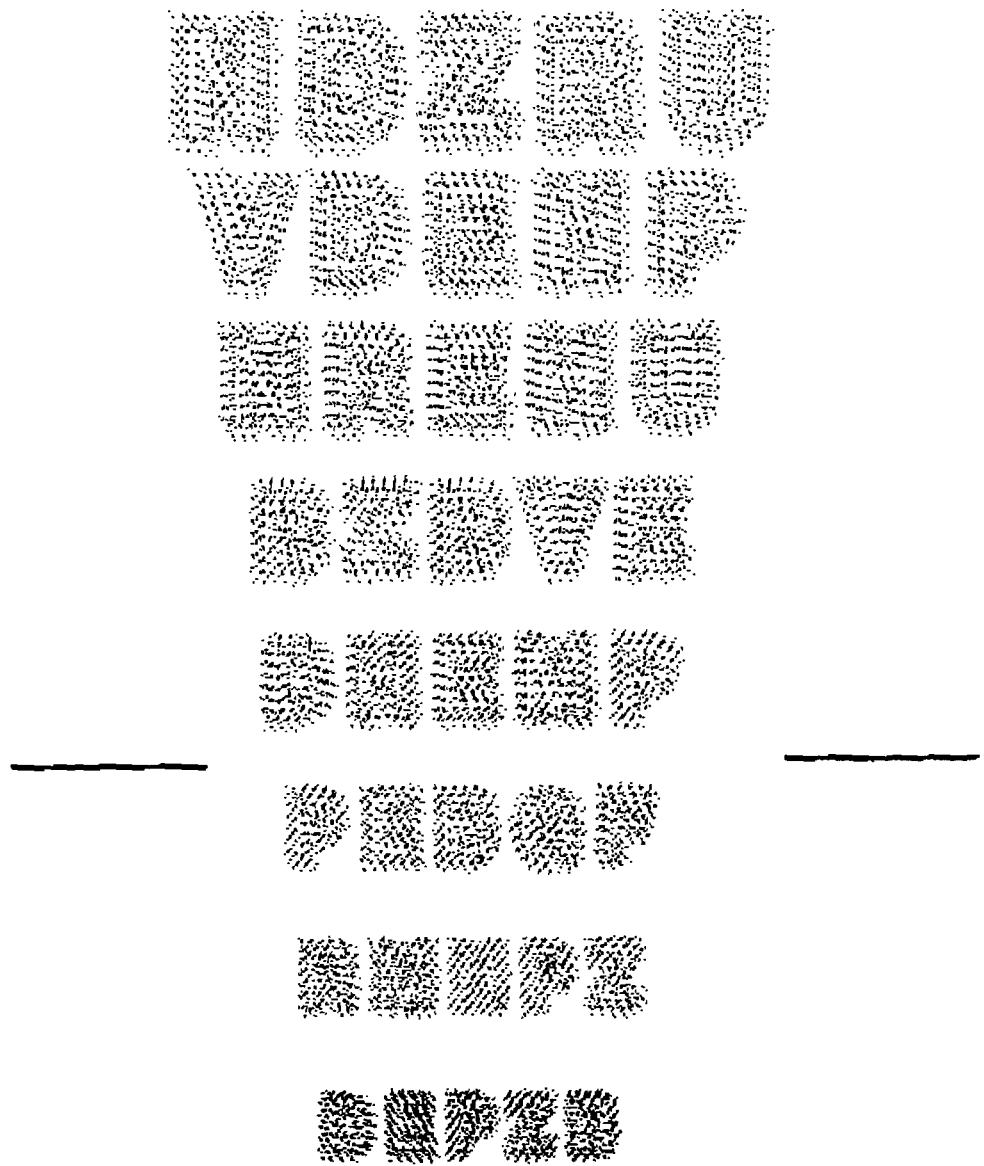
FIG. 9 illustrates simulated retinal image of an eye with −0.2 microns of spherical aberration, wearing a lens with +0.6 microns of spherical aberration that is decentered 0.5 mm temporally and horizontally, inducing 0.63 microns of horizontal and vertical coma.

For example, assume the goal, OELSA, of the multifocal lens design is to achieve +0.4 microns of (eye+lens) spherical aberration (ILSA) when the lens is on the eye. Assuming 0 microns LFSA, LPSA, and LESA, if the eye has inherent +0.2 microns of spherical aberration (ESA), then the lens design would only require an additional +0.2 microns of spherical aberration (LSA). Given that this lens may decenter 0.5 mm vertically and horizontally on the eye, inducing roughly 0.21 microns of vertical and horizontal coma, a simulated retinal image similar to that of FIG. 8 would be expected. However, again assuming 0 microns LFSA, LPSA and LESA, if an eye had −0.2 microns of inherent spherical aberration (ESA), and the goal remained +0.4 microns of spherical aberration (OELSA), +0.6 microns of spherical aberration (ILSA) would be necessary in the lens design. When this lens was then decentered on the eye, roughly 0.63 microns of coma are induced, and a simulated retinal image similar to that of FIG. 9 would be expected. In the presence of lens decentration, the image quality is superior with the lens design with lower inherent levels of spherical aberration, and accordingly lower induced levels of coma as illustrated in FIG. 8.

The exemplary embodiments of the invention summarized above and illustrated and described in detail in the figures and foregoing description are illustrative and not limiting or restrictive. Only the presently preferred exemplary embodiments have been shown and described and all changes and modifications that come within the scope of the invention are to be protected. It should be understood that various features and aspects of the embodiments described above may not be necessary and embodiments lacking the same are also protected.

What is claimed is:

1. A method comprising:
   determining a sign-specific level of spherical aberration of a patient's eye;
   determining an intended level of spherical aberration for an optical system including the patient's eye effective to provide a desired increase in near distance vision of the patient's eye; and
   providing an ophthalmic lens having spherical aberration of the same sign as the patient's eye and of a magnitude effective to provide substantially the intended level of spherical aberration for the optical system.

2. A method according to claim 1 wherein the spherical aberration of the ophthalmic lens is determined according to the equation
   LSA equals ISA minus the sum of ESA, LPSA, LESA, and LFSA, where
   LSA is the spherical aberration of the ophthalmic lens,
   ISA is the intended level of spherical aberration,
   ESA is the sign-specific level of spherical aberration of the patient's eye,
   LPSA is spherical aberration of the ophthalmic lens determined by its lens power,
   LESA is lens-error spherical aberration due to the difference between the intended off-eye lens spherical aberration of the lens and actual off-eye lens spherical aberration of the lens, and
   LFSA is spherical aberration introduced by lens flexure on the eye.

3. A method according to claim 1 wherein the ophthalmic lens provides a minimum spherical aberration effective to substantially maximize multifocality and image quality.

4. A method according to claim 3 wherein the ophthalmic lens substantially minimizes induced aberration due to lens decentration.

5. A method according to claim 1 wherein the ophthalmic lens is a contact lens.

6. A method according to claim 1 wherein the ophthalmic lens is an intraocular lens.

7. A method comprising:
   determining a sign-specific level of spherical aberration of a patient's eye;

determining a desired level of spherical aberration for an optical system including the patient's eye effective to provide a desired change in the near distance vision of the patient's eye; and providing an ophthalmic correction having spherical aberration of the same sign as the patient's eye and of a magnitude effective to provide substantially the desired level of spherical aberration for the optical system.

8. A method according to claim 7 wherein the spherical aberration provided by the correction is determined in accordance with the equation:

CSA equals DSA minus the sum of ESA and CESA, where
CSA is the spherical aberration provided by the ophthalmic correction,
DSA is desired level of spherical aberration for an optical system including the patient's eye effective to provide desired multifocality,
ESA is the spherical aberration of the eye, and
CESA is the error in spherical aberration of the ophthalmic correction relative to its intended design, and wherein the ophthalmic correction provides the minimum spherical aberration effective to provide the desired multifocality in combination with the spherical aberration of the eye.

9. A method according to claim 7 wherein the ophthalmic correction is a contact lens.

10. A method according to claim 7 wherein the ophthalmic correction is an intraocular lens.

11. A method according to claim 7 wherein the ophthalmic correction is a corneal inlay or a corneal onlay.

12. An apparatus designed according to the method of claim 7 in which the ophthalmic correction is a surgical modification of the corneal tissue.

13. An apparatus comprising: an ophthalmic lens providing a level of spherical aberration determined based upon a level of spherical aberration inherent in a patient's eye and a desired level of spherical aberration effective to provide a desired increase in the near distance vision of the eye, wherein the level of spherical aberration of the ophthalmic lens has the same sign as the level of spherical aberration of the patient's eye and the desired level of spherical aberration is substantially provided by the ophthalmic lens in combination with the eye.

14. An apparatus according to claim 13 wherein
LSA equals DSA minus the sum of ESA, LESA, and LFSA, where
LSA is the spherical aberration provided by the ophthalmic lens,
DSA is desired level of spherical aberration for an optical system including the patient's eye effective to provide desired multifocality,
ESA is the spherical aberration of the eye,
LESA is lens-error spherical aberration due to the difference between the intended off-eye lens spherical aberration of the lens and actual off-eye lens spherical aberration of the lens, and
LFSA is the spherical aberration due to flexure of the lens on the eye.

15. An apparatus according to claim 13 wherein the ophthalmic lens is a contact lens.

16. An apparatus according to claim 15 wherein the contact lens provides the minimum spherical aberration effective to provide the desired multifocality in combination with the spherical aberration of the eye.

17. An apparatus according to claim 13 wherein the ophthalmic lens is an intraocular lens.

* * * * *